Patented July 18, 1939

2,166,142

UNITED STATES PATENT OFFICE 2,166,142

SULPHOCARBOXYLIC ACID ESTERS

Benjamin R. Harris, Chicago, Ill.

No Drawing. Application January 21, 1937, Serial No. 121,563. Renewed January 23, 1939

30 Claims. (Cl. 260—400)

My invention relates to a new class of chemical substances, and more in particular to a new class of chemical substances particularly adapted for use as detergents, wetting, penetrating, lathering, flotation and anti-spattering agents, and for frothing purposes.

In certain classes of industries, there is a need for a certain class of chemical substances usually used in relatively small quantities but capable of use in larger quantities to secure an effect principally the result of a wetting action such as at a water-oil interface. In the textile and dyeing industries, for example, there are many situations where a wetting or detergent action is imperative and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen. These problems are considered by some investigators as entirely a matter of wetting; in other words, by promoting greater attraction between the oleaginous and aqueous portions of the emulsion at the interfaces thereof. Although the problem is probably not one of wetting action entirely, it appears that certain compounds which in theory tend to concentrate at the water-oil interface have an effect upon the spattering behavior of margarine. This problem is discussed and a remedy disclosed in my Patent No. 1,917,256, filed as a continuation-in-part of a prior application, Serial No. 475,622, now Patent No. 1,917,250. My present application is a continuation-in-part of my copending application, Serial No. 627,096, filed July 30, 1932.

The principal object of my present invention is the provision of a new class of chemical substances capable of satisfactory use in connection with the problems hereinabove discussed.

Another object is the provision of a new class of chemical substances which are in general of relatively simple structure and can be cheaply made in commercial quantities.

Another object is the provision of a class of chemical substances of the character set forth which in the main will be innocuous and non-toxic, even though employed in such foods as margarine.

Another object is the provision of a new class of chemical substances having improved wetting characteristics.

Other objects and features of the invention will be apparent from a consideration of the following detailed description.

The substances of my invention are in general ester derivatives of lower molecular weight carboxylic acids, preferably fatty acids, with at least one unesterified sulphonic acid group in the carboxylic or fatty acid radical wherein the group esterified with the carboxylic or fatty acid has a lipophile radical with at least four carbon atoms. In certain circumstances there may be more than one unesterified sulphonic acid group in the carboxylic or fatty acid radical or there may be sulphonic acid groups that are esterified and other sulphonic acid groups that are not esterified, but in all cases there must be at least one unesterified sulphonic acid group in the carboxylic or fatty acid radical. The carboxylic or fatty acid radical with the free sulphonic acid group is of relatively low molecular weight and should contain not more than eight carbons.

Considering the compounds from another aspect, the molecule in each instance contains a relatively high molecular weight lipophile group and a relatively low molecular weight hydrophile group which, in the class of compounds to which my present invention relates, are sulphonic acid radicals. From still another angle, the compounds may be considered as combinations of a higher molecular weight lipophile group and a relatively low molecular weight sulpho-carboxylic acid group, preferably a sulpho-fatty acid group. A more complete understanding of what may comprise the lipophile group and the particular character of the sulpho-carboxylic or sulpho-fatty acid group will be had as the detailed description progresses.

The function of the sulphonic acid group is to impart hydrophilic properties, that is, water wetting or water attracting properties, to the molecule as a whole. The groups which are esterified by the sulpho-carboxylic or sulpho-fatty acid are in general of a lipophile character. At times they may be strongly lipophilic and at other times moderately lipophilic. They may be of low molecular weight or of moderately high molecular weight, depending upon the purpose for which the substances may be used. Furthermore, a group or groups which are esterified by the sulpho-carboxylic or fatty acid may have hydrophilic radicals of their own. An example of this type of substance is monostearyl glycerol sulphoacetate, sodium salt.

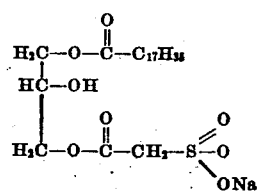

Mono stearin sulphoacetate (sodium salt)

It is evident that in the substance represented above, the group which is esterified by the sulphoacetic acid happens to have a hydrophilic radical of its own, namely the unesterified hydroxy radical in the glycerol residue.

More specifically, the substances of my invention are lower molecular weight sulpho-carboxylic or sulpho-fatty acid esters of polyhydroxy substances, at least one hydroxy group of the polyhydroxy substance being esterified with a carboxylic acid containing at least four carbon atoms and preferably from eight to eighteen carbon atoms. In addition to the compound mentioned above, other examples of compounds falling within the scope of my invention are as follows:

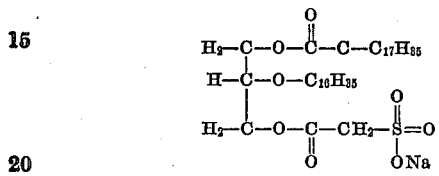

Cetyl ether of mono stearin sulphoacetate (sodium salt)

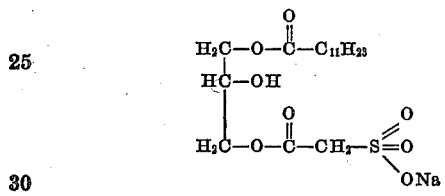

Monolaurin sulphoacetate (sodium salt)

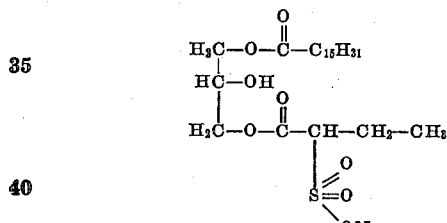

Monopalmitin sulphobutyrate (sodium salt)

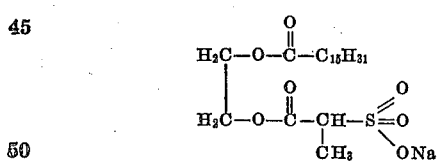

Mono-palmitic acid ester of ethylene glycol sulphopropionate (sodium salt)

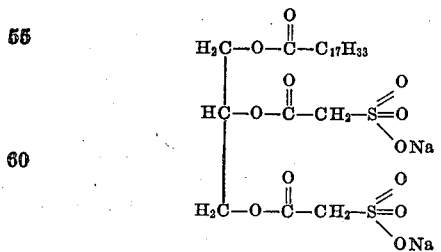

Di-sulphoacetic acid ester of mono-olein (disodium salt)

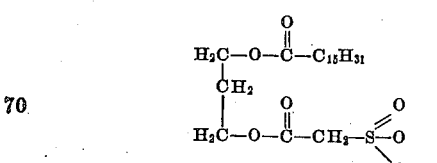

Mono-palmitic acid ester of tri-methylene glycol sulphoacetate (sodium salt)

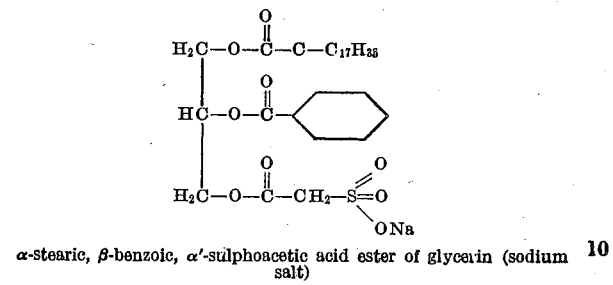

α-stearic, β-benzoic, α'-sulphoacetic acid ester of glycerin (sodium salt)

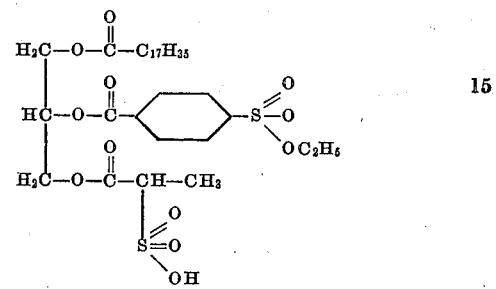

α-stearic, β-(p-sulphethoxy) benzoic, α'-sulphopropionic acid ester of glycerin

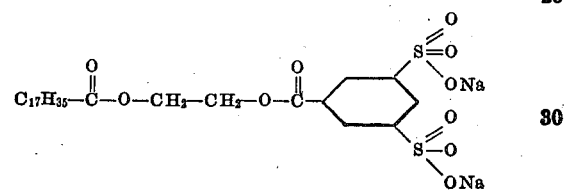

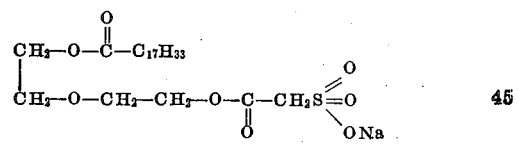

Monostearic acid ester of diethylene glycol sulphoacetate (sodium salt)

CH₂—O—C—C₁₇H₃₃ ...

Mono-oleic acid ester of diethylene glycol sulphoacetate (sodium salt)

Generally speaking, I may select many different types of compounds as lipophile groups which are to be esterified with the polyhydroxy substances, principally compounds having lipophile radicals of relatively high molecular weight. For example, the following materials may be utilized as sources of lipophile groups: hydro-aromatic acids such as naphthenic acid, abietic acid, hydroxy aromatic acids such as hydroxy benzoic acid, fatty acids such as butyric acid, caprylic acid, caproic acid, capric acid, saturated and unsaturated higher aliphatic acids such as the higher fatty acids containing at least eight carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, and carnauba wax and carboxylic acids derived, by oxidation and other methods, from petroleum.

The polyhydroxy substances which provide the linkage between the lipophile group and the sulpho-carboxylic or sulpho-fatty group may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy-carboxylic acids such as tartaric acid, music acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as for example:

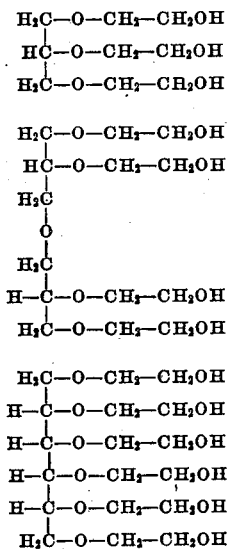

(For convenience, all hydroxyl groups are written facing one way.)

From a study of the compounds which I list hereinabove, those skilled in the art will understand that I may use many different expedients for forming the compounds insofar as the dominant lipophile group and the relatively low molecular weight sulpho-carboxylic or sulpho-fatty acid group are concerned. As stated, however, ester linkages are utilized between these two portions of the compound, and the skilled chemist will understand in general the most approved practices in securing this result. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case of aliphatic sulphonic acids, and for that matter, even for the production of aromatic sulphonic acids, a reactive halogen may be caused to react with sodium sulphite or potassium sulphite or ammonium sulphite or some other sulphite in aqueous solution, if desired.

Another method is to introduce a sulph-hydryl or disulphide or some other suitable sulphur group and then oxidize to the sulphonic acid with nitric acid or a permanganate or some other oxidizing agent.

Still other methods will suggest themselves to the skilled chemist. Thus, for example, one or more hydroxyl groups of the polyhydroxy substance may be caused to react, under suitable conditions, with sulpho-acyl halides such as are represented by the formula

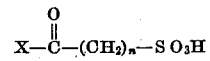

wherein X is halogen, particularly chlorine or bromine, and $n$ is a small whole number, at least one. The sulpho-acyl halides may also be of the type wherein the sulphonic group is attached to an intermediate carbon instead of to the terminal carbon as illustrated above.

Another method which may also be employed to produce the compounds of my invention involves reacting a polyhydroxy compound or derivative thereof, there being at least one free hydroxyl group present in the polyhydroxy nucleus, with a sulpho-acyl anhydride the sulphonic group of which may be attached to either the terminal or an intermediate carbon atom of the sulpho-acyl anhydride.

My preferred process comprises reacting one or more free or esterifiable hydroxy groups of a polyhydroxy substance or derivative of a polyhydroxy substance with a halogeno-carboxylic acid such as chloracetic or bromacetic acid, or with a halogeno-carboxylic acid halide such as chlor-acetyl chloride or brom-acetyl bromide, to form a chloracetate or bromacetate, and then converting the latter into the sulphonic acid derivative by reaction with an alkali metal sulphite.

The following examples are illustrative of the preparation of compounds falling within the scope of my invention. It will be understood that said examples are given only by way of illustration and are not to be considered in any way limitative of the true scope of my invention.

EXAMPLE I.—*Monostearine sulphoacetate, Na salt*

(a) 700 parts of monostearine were heated with 175 parts of chloracetic acid for 3 hours at a temperature of 150–160 degrees C. in an atmosphere of $CO_2$ and with agitation. The reaction product was washed free of chloracetic acid with 4 times its own volume of water at 95 degrees C. and, to assist in separation, 100 parts of salt were added to the wash water.

(b) The product obtained in (a) was mixed with 500 parts of water, heated to about 60 degrees C., and then 175 parts of sodium sulphite were added. The temperature was maintained at 60–75 degrees C. with constant stirring for the first hour, then raised to 90–95 degrees C. and kept at that temperature for about three-quarters of an hour.

(c) To remove excess sulphite and other objectionable impurities, the product obtained in (b) was dispersed in 8 times its own volume of water at 80 degrees C., salted out with about 10% salt, allowed to settle and the wash water drained off.

The process of dispersion, salting out and draining was repeated twice. On stirring and cooling, a white paste containing about 50% water was obtained. The water may be eliminated in any desired manner to produce a dry product.

EXAMPLE II.—*Monostearine sulphoacetate, K salt*

(a) 100 parts of monostearine were heated with 60 parts of chloracetic acid at 160 degrees C. for several hours, using a stream of $CO_2$ for the purpose of agitation and to remove water coming off in the reaction. The heating was continued until the chlorine content corresponded approximately to 100% monostearine chloracetate. When the reaction was completed, the product was washed free of chloracetic acid and dried.

(b) 40 parts of the monostearine chloracetate were mixed with 30 parts of potassium sulphite dissolved in 50 parts of water. 2 parts of potassium iodide were added and the mixture stirred and heated at a temperature of 50–60 degrees C. for about 8 hours, then for about 3 hours at 70–75 degrees C. The potassium iodide acts as a catalyst in the reaction.

(c) To 80 parts of the mixture obtained in (b), 20 parts of water were added followed by 700 parts of hot isopropyl alcohol. The mixture was then heated to the boiling point and filtered hot. The alcohol solution was allowed to cool and the precipitate that came down was filtered off. The filtrate was used for a second extraction. The extraction was repeated several times with the same alcohol until very little or no precipitate came down on cooling. The precipitates were combined and dried at room temperature. A white powder was obtained easily soluble in warm water and consisted essentially of the potassium salt of monostearine sulphoacetate.

EXAMPLE III.—*Distearine sulphoacetate*

400 parts of pure monostearine sulphoacetate were heated with 300 parts of stearyl chloride in 500 parts Benzol at a temperature of 80–100 degrees C. until no further evolution of hydrochloric acid could be observed. The excess Benzol was distilled off and the heating continued for another half hour at a slightly higher temperature. A brittle substance which could easily be ground into a powder was obtained. It dispersed readily in water.

EXAMPLE IV.—*Distearine sulphoacetate, K salt*

(a) 200 parts of distearine were heated with 65 parts of chloracetic acid for 3 hours at 160–170 degrees C. When the reaction was completed the product was washed free of chloracetic acid and dried.

(b) 50 parts of the product obtained in (a) were mixed with 25 parts of potassium sulphite dissolved in 35 parts of water. 2 parts of potassium iodide were added and the mixture stirred and heated for about 10 hours on a water bath at 60–70 degrees C. and about 2 hours at 75–80 degrees C.

(c) To remove excess sulphite, 50 parts of the product obtained in (b) were dispersed in 500 parts of water, heated to 80 degrees C., and then salted out with 15% salt. The washing process was repeated several times. A paste containing about 50% water was obtained.

(d) For further purification, 150 parts of isopropyl alcohol were added to 10 parts of the paste, the mixture brought to the boiling point and filtered hot. The filtrate was allowed to cool and the precipitate that came down filtered off, washed several times with ether and then dried at room temperature. The product obtained dispersed readily in hot water.

EXAMPLE V.—*Monostearine disulphoacetate, K salt*

(a) 500 parts of monostearine were heated with 500 parts of chloracetic acid at a temperature of 160 degrees C. for several hours using a stream of $CO_2$ for the purpose of agitation and to remove water of reaction. The heating was continued until the chlorine content corresponded to approximately 100% of monostearine dichloracetate.

(b) 35 parts of the washed and dried product obtained in (a) were mixed with 25 parts potassium sulphite in 40 parts of water. 4 parts of potassium iodide were added and the mixture stirred and heated on a water bath for about 8 hours at 70–80 degrees C.

(c) The product obtained in (b) was dispersed in 400 parts of water at 60–70 degrees C. and the dispersion saturated with sodium chloride. Very little separation took place. On chilling in an ice bath to 10 degrees C., the product could be isolated by gravity filtration. The process of dispersion, saturating with salt, chilling and gravity filtration was repeated a second and third time. A white paste containing about 50% water was obtained.

(d) To further purify the product obtained in (c) 10 parts of the latter were dispersed in 10 parts of water. 80 parts of hot isopropyl alcohol were added and the mixture brought to the boiling point and then filtered hot. On cooling and by the addition of a little more isopropyl alcohol, the sulphoacetate was precipitated. The precipitate was filtered off and dried at room temperature.

EXAMPLE VI.—*Monostearic acid ester of diethylene glycol sulphoacetate, K salt*

(a) 500 parts of diethylene glycol monostearate, prepared by heating a mixture of one part of stearic acid with one part of diethylene glycol at a temperature of about 220 degrees C., using 0.1% KOH until the free fatty acid content is down to about ½ to 1%, was heated with 250 parts of chloracetic acid at 160–170 degrees C. for 4 hours. The product was washed free of chloracetic acid and dried.

(b) 50 parts of the product obtained in (a) were mixed with 35 parts of potassium sulphite and 50 parts water. 2 parts of potassium iodide were added and the mixture stirred and heated for about 10 hours at 70–75 degrees C. At the end of the 10 hours, 800 parts of hot isopropyl alcohol were added, the mixture brought to the boiling point and filtered hot. The alcohol solution was allowed to cool. The product was obtained in the form of a precipitate consisting of crystals of grayish leaflets. These dissolved readily in hot water.

EXAMPLE VII.—*Cottonseed oil fatty acid esters of diethylene glycol sulphoacetate, K salt*

(a) 500 parts of cottonseed oil fatty acid mono esters diethylene glycol, prepared by reesterifying cottonseed oil with diethylene glycol, were heated with 250 parts of chloracetic acid for 3 hours at 160–170 degrees C. in an atmosphere of $CO_2$.

(b) 200 parts of washed and dried product obtained in (a) were mixed with 130 parts of potassium sulphite and 200 parts of water. 4 parts of potassium iodide were added and the mixture stirred and heated for about 8 hours at 55–65 degrees C. and then 4 hours at 70–75 degrees C.

(c) To remove excess sulphite and other impurities, the reaction product was dispersed in 8 times its own volume of water, heated to about 70 degrees C., 15% of salt added and allowed to separate. The wash water was drained off and the washing process repeated a second and third time. A soupy, dark brown paste, containing about 50% water, was obtained.

EXAMPLE VIII.—*Coconut mono fatty acid esters of diethylene glycol sulphoacetate, K salt*

(a) 400 parts of the fatty acid mono esters of diethylene glycol with mixed coconut oil fatty acids were heated with 260 parts of chloracetic acid for 3 hours at 160 degrees C. using a stream of $CO_2$ for agitation and removal of moisture.

(b) 200 parts of the washed and dried product obtained in (a) were mixed with 130 parts of potassium sulphite and 200 parts of water. 4 parts of potassium iodide were added and the mixture stirred and heated on a water bath at 60–70 degrees C. for about 10 hours. The reaction product was then dispersed in about 8 times its own volume of water heated to 60–70 degrees C. and salted out with 15% salt. The washing was repeated a second and third time. A thin paste, light in color and containing 60% water was obtained.

(c) The product may be used as finally obtained in (b) or may be purified by heating to the boiling point with 8 volumes of isopropyl alcohol, filtering hot and allowing the alcohol solution to cool. The precipitate which comes down is filtered off and dried at room temperature. The filtrate may be evaporated to dryness to recover the alcohol soluble substances.

EXAMPLE IX.—*Monococonut oil fatty acid ester of glycerine sulphoacetate, K salt*

(a) Coconut oil mono-fatty acid ester of glycerine was prepared by reesterifying coconut oil with excess of glycerine and removing the excess of glycerine. 300 parts of said ester were heated with 200 parts of chloracetic acid at 160 degrees C. for several hours in an atmosphere of $CO_2$ until the theoretical chlorine content corresponding to the monochloracetate was obtained.

(b) 50 parts of the washed and dried product obtained in (a) were reacted with 40 parts of potassium sulphite in 60 parts of water and 2 parts potassium iodide at 60–65 degrees C. for about 8 hours. The product was isolated by treating with isopropyl alcohol as outlined in the preceding examples.

Those skilled in the art are referred to my Patent No. 1,917,260, in which I disclose the use of some of the compounds of my present invention as anti-spattering agents for use in margarine. In this patent, I also treat of the manner of making some of these compounds.

Those of my substances which are freely soluble in water may be recovered from their solutions and from their water solutions in the customary manner by concentrating and crystallizing. As stated hereinabove, as the mass of the lipophile radical increases, solubility decreases and affinity for water is manifested by the dispersibility in water. From these dispersions, my substances may be readily recovered by "salting out" with suitable soluble electrolytes. Common salt is very satisfactory for this purpose in most cases. When salted out of an aqueous dispersion at temperatures ranging from 60 to 95° C., the substances are obtained in the form of a paste with a water content ranging from approximately 25 to 75%. The more hydrophilic the substance, the greater the water content, and, of course, the salt is present in the water of the paste in approximately the same concentration in which it existed in the dispersion from which the paste was salted out.

The compounds of my invention may be represented by the following general formula

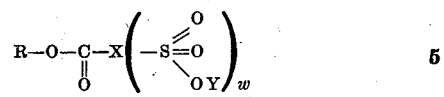

wherein R is the residue of a polyhydroxy substance in which the hydrogen of at least one hydroxyl group is substituted by an acyl group containing at least four carbon atoms and preferably from eight to eighteen carbon atoms, X is the carbon-hydrogen residue of the sulphocarboxylic acid, Y is a cation, and $w$ is a small whole number, at least one.

I have previously referred to the fact that the lipophile group may in itself contain hydrophile radicals. For example, in the case of monostearin sulphoacetate, the hydroxy radical of the second glycerine carbon has a recognized hydrophilic character. The group as a whole, however, of which this hydroxy radical is a part, is dominantly lipophile, the single hydroxy radical in such a compound being insufficient to impart dominant hydrophile characteristics to the group as a whole. Moreover, in the case of a compound having an esterified sulphonic acid group, this sulphonic acid group will usually be found to possess a lipophile character or at least will not have a marked hydrophile character due to the additional group or radical which has been attached to the sulphonic acid group by esterification. When the character "R" is used in the formula, therefore, to represent a lipophile group, it is with the assumption that the group as a whole does not possess a hydrophilic character.

Considering more specifically the character of the lipophile group, it will at once be apparent that for the most part I employ esters of glycerol, glycols or other polyhydric alcohols or polyhydroxy substances attached to the sulpho-fatty acid of relatively low molecular weight through an ester linkage. In so far as the sulpho-carboxylic or sulpho-fatty acid group is concerned, I may employ a sulpho-acetate, sulpho-butyrate, or other similar groups containing an unesterified sulphonic acid radical and, generally, not more than eight carbon atoms. In general, however, I have found that the sulpho-acetates particularly produce compounds of exceptionally valuable characteristics and they have the advantage of being relatively inexpensively produced from commercially available substances.

The term "sulpho fatty acid" as employed throughout the specification and claims is used in a strictly rigorous sense to mean an aliphatic compound which contains at least one

These substances are obviously free of sulphate groups or in other words no part of the compound is in the form of an ester of sulphuric acid. The numerous examples given are clear in this feature.

In the event that the compounds of my invention are made by reacting the halogen derivatives with alkali metal or ammonium sulphites or other soluble sulphites, the corresponding alkali metal or ammonium sulphonic acid derivative will be produced. When prepared by other methods so that the compounds contain the sulphonic acid group ($-SO_3H$), the hydrogen thereof may be replaced by other cations such as calcium, magnesium, aluminum, zinc, amines, alkylolamines such as mono-, di-, and tri-ethanolamine and mixtures thereof, quaternary ammonium bases, etc. It will be understood that by the term "cation", as used throughout the specification and claims, is meant hydrogen and such other elements as are mentioned herein, and, in general, atoms or radicals which are regarded as bearing a positive charge or capable of replacing acidic hydrogen.

My present application is a continuation-in-part of my copending application, Serial No. 34,840, filed August 5, 1935, which latter application is a continuation-in-part of my application, Serial No. 627,096, filed July 30, 1932. This latter application is in turn a division of my application Serial No. 481,349, filed September 11, 1930, now Patent No. 1,917,255, which was a continuation-in-part of my prior application Serial No. 475,622, filed August 15, 1930, now Patent No. 1,917,250.

The term "residue", as used throughout the specification and claims, is employed in its ordinarily understood chemical significance. For example, where one of the hydroxyl groups of glycerine is esterified with a fatty acid and another of the hydroxyl groups of the glycerine is esterified with a sulpho-carboxylic acid, that which remains of the glycerinemolecule, for example

is the "residue" of the polyhydroxy substance, in this case glycerine.

Similarly, the term "carbon-hydrogen residue" of a sulpho-carboxylic acid is employed as in conventional chemical nomenclature. Thus, for example, if sulpho-acetic acid (HOOC—CH₂—SO₃H) is esterified with glycerine, the group —CH₂— is to be considered as the "carbon-hydrogen residue" of the sulpho-acetic acid.

Unless otherwise indicated, the term "higher", wherever employed in the claims, will be understood to mean at least eight carbon atoms and, concomitantly, the term "lower" will mean less than eight carbon atoms.

Whenever the term sulpho-carboxylic ester, sulphoacetate, or the like expression is employed in the claims, it will be understood to cover the compounds irrespective of whether the hydrogen of the sulphonic acid is present as such or replaced by another cation.

What I claim as new and desire to protect by Letters Patent of the United States is:

1. A chemical compound corresponding to the formula

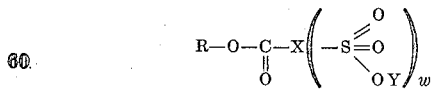

wherein R is the residue of a polyhydroxy substance in which the hydrogen of at least one hydroxyl group is substituted by an acyl group containing at least four carbon atoms, X is the carbon-hydrogen residue of a lower molecular weight sulpho-carboxylic acid, Y is a cation, and w is a small whole number, at least one.

2. The compound of claim 1 wherein the polyhydroxy substance is a member of the group consisting of glycols, glycerol, polyglycols, polyglycerols, sugars, and sugar alcohols.

3. The compound of claim 1 wherein the acyl group contains from twelve to eighteen carbon atoms.

4. The compound of claim 1 wherein the polyhydroxy substance is a member of the group consisting of glycols, glycerol, polyglycols, polyglycerols, sugars, and sugar alcohols, and wherein the acyl group contains from twelve to eighteen carbon atoms.

5. A derivative of a lower molecular weight polyhydric alcohol, the hydrogen of only one hydroxyl group of which is substituted by a lower molecular weight sulpho-carboxylic acid radical, and a hydrogen of only one hydroxyl group of the polyhydric alcohol is substituted by a straight chain higher molecular weight acyl radical.

6. The compound of claim 5 wherein the sulpho-carboxylic acid is sulpho-acetic acid.

7. A chemical compound corresponding to the formula

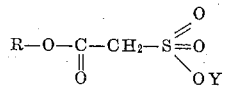

wherein R is a lower molecular weight polyhydric alcohol radical in which the hydrogen of one hydroxyl group is substituted by a higher molecular weight acyl radical, and Y is a member of the group consisting of hydrogen and monovalent alkali metals.

8. A carboxylic ester of a lower molecular weight sulpho-carboxylic acid, the sulphonic group of which is unesterified, wherein the radical esterified with the lower molecular weight sulpho-carboxylic acid is a carboxylic acid ester of glycerol, the carboxylic radical of said latter carboxylic acid ester of glycerol containing at least four carbon atoms.

9. A carboxylic ester of sulpho-acetic acid, the sulphonic group of which is unesterified, wherein the radical esterified with the sulpho-acetic acid is a carboxylic acid ester of a glycol, the carboxylic radical of said carboxylic acid ester of the glycol containing at least four carbon atoms.

10. A carboxylic ester of a lower molecular weight sulpho-carboxylic acid, the sulphonic group of which is unesterified, wherein the radical esterified with the sulpho-carboxylic acid is a fatty acid ester of glycerol, the fatty acid radical of which contains from twelve to eighteen carbon atoms.

11. A carboxylic ester of a sulpho-fatty acid and a higher fatty acid monoglyceride, wherein the sulpho-fatty acid radical contains less than eight carbon atoms and at least one unesterified sulphonic acid group.

12. Monostearin sulpho-acetate.

13. A carboxylic ester of sulpho-acetic acid and a fatty acid ester of glycerol, wherein the fatty acid radical contains at least four carbon atoms and wherein the sulphonic acid group of the sulpho-acetic acid is unesterified.

14. A carboxylic ester of a lower molecular weight sulpho-fatty acid and a mono-fatty acid ester of a glycol, wherein the fatty acid radical contains at least four carbon atoms and wherein the sulphonic acid group of the sulpho-fatty acid is unesterified.

15. A lower molecular weight sulpho-fatty acid ester of a compound of the class consisting of monoglycerides and diglycerides, the carboxylic radical of the lower molecular weight sulpho-fatty acid being esterified with at least one of the hydroxy groups of the glycerol, the carboxylic acid radicals of said monoglycerides and diglycerides containing at least four carbon atoms.

16. A lower molecular weight sulpho-carboxylic acid ester of a polyhydric alcohol wherein the hydrogen of one hydroxyl group of the polyhydric alcohol is replaced by a straight chain higher molecular weight acyl radical.

17. The compound defined in claim 16 wherein the polyhydric alcohol is a tri-hydric alcohol.

18. The compound defined in claim 16 wherein the polyhydric alcohol is glycerol.

19. The sulpho-acetate of a polyhydric alcohol wherein the hydrogen of one hydroxyl group of the polyhydricalcohol is replaced by a straight chain higher molecular weight acyl radical.

20. The compound defined in claim 19 wherein the polyhydric alcohol is glycerol.

21. Mixed coconut oil fatty acid esters of diethylene glycol sulpho-acetate.

22. A process for the preparation of lower molecular weight sulpho-carboxylic esters which comprises esterifying a higher molecular weight acyl derivative of a polyhydroxy substance with a substance selected from the group consisting of halogeno-lower molecular weight fatty acids and acyl halides thereof whereby a halogen-containing ester is produced, and then reacting the resulting product with a sulphite selected from the group consisting of alkali metal and ammonium sulphites.

23. A process for the preparation of lower molecular weight sulpho-carboxylic esters which comprises esterifying a fatty acid ester of a polyhydroxy substance, there being at least one free hydroxyl group attached to the polyhydroxy nucleus, the fatty acid radical of said ester containing from 12 to 18 carbon atoms, with a member selected from the group consisting of lower molecular halogeno mono-carboxylic acids and acyl halides thereof whereby a halogen containing ester is produced and then reacting the resulting product with a sulphite selected from the group consisting of alkali metal and ammonium sulphites.

24. The process of preparing monostearin sulpho-acetate which comprises reacting monostearin with a member of the group consisting of chlor-acetyl chloride and brom-acetyl bromide, and then treating the resulting product with a sulphite selected from the group consisting of alkali metal and ammonium sulphites.

25. The process of preparing sulpho-carboxylic esters which comprises reacting a higher fatty acid mono-glyceride with a member selected from the group consisting of lower molecular weight halogen-containing aliphatic monocarboxylic acids and acyl halides thereof whereby a halogen-containing ester is produced, and then reacting the resulting ester with a sulphite selected from the group consisting of alkali metal and ammonium sulphites whereby the halogen is replaced by a sulphonic acid radical.

26. The process of preparing sulpho-carboxylic esters which comprises reacting a compound having the following general formula $$(RO)_v{-}X({-}OH)_w$$

wherein R is an acyl radical containing at least 4 carbon atoms, X is the carbon-hydrogen residue of a polyhydroxy substance, and $v$ and $w$ are small whole numbers, at least one, with a member selected from the group consisting of lower molecular weight halogen-containing aliphatic monocarboxylic acids and acyl halides thereof whereby a halogen-containing ester is produced, and then reacting the resulting ester with a sulphite selected from the group consisting of alkali metal and ammonium sulphites whereby the halogen is replaced by a sulphonic acid radical.

27. The process of claim 26 wherein R contains from 12 to 18 carbon atoms, and the lower molecular weight halogen-containing aliphatic monocarboxylic acids and acyl halides are members of the group consisting of chlor-acetic acid, brom-acetic acid, chlor-acetyl chloride and brom-acetyl bromide.

28. The process of preparing sulpho-carboxylic acid esters which comprises reacting a compound selected from the group consisting of brom-acetic and chlor-acetic acid esters of a higher fatty acid ester of a polyhydroxy substance with a sulphite selected from the group consisting of alkali metal and ammonium sulphites whereby the halogen is replaced by a sulphonic acid radical.

29. Coconut oil fatty acid mono-esters of glycerine mono-sulphoacetate.

30. A chemical compound corresponding to the formula $$R\left(-O-\underset{\underset{O}{\|}}{C}-X-S\underset{OY}{\overset{\nearrow O}{\underset{\searrow}{=}O}}\right)_w$$

wherein R is the residue of a polyhydroxy substance in which the hydrogen of at least one hydroxyl group is substituted by an acyl group containing at least four carbon atoms, X is the carbon-hydrogen residue of a lower molecular weight sulpho-carboxylic acid, Y is a cation, and $w$ is a small whole number, at least one.

BENJAMIN R. HARRIS.

Certificate of Correction

Patent No. 2,166,142. July 18, 1939.

BENJAMIN R. HARRIS

It is hereby certified that errors appear in the printed specification of the above numbered patent requiring correction as follows: Page 2, first column, lines 13 to 19, inclusive, strike out the formula and insert instead the following—

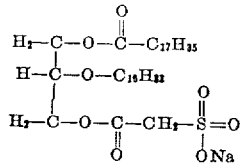

page 3, first column, line 13, for the word "music" read *mucic;* page 7, first column, line 9, claim 19, for "The" before "sulpho-acetate" read *A*; and that the said Letters Patent should be read with these corrections therein that the same may conform to the record of the case in the Patent Office.

Signed and sealed this 26th day of September, A. D. 1939.

[SEAL]

HENRY VAN ARSDALE,
*Acting Commissioner of Patents.*